United States Patent [19]

Chu et al.

[11] Patent Number: 4,776,398

[45] Date of Patent: * Oct. 11, 1988

[54] OIL RESERVOIR PERMEABILITY CONTROL

[75] Inventors: A. S. Chu, Spotswood; Harold S. Chung, Princeton; Dennis H. Hoskin, Lawrenceville; Thomas O. Mitchell, Trenton; Paul Shu, Princeton Junction, all of N.J.

[73] Assignee: Mobil Oil Corporation, New York, N.Y.

[ * ] Notice: The portion of the term of this patent subsequent to Mar. 31, 2004 has been disclaimed.

[21] Appl. No.: 31,736

[22] Filed: Apr. 30, 1987

Related U.S. Application Data

[63] Continuation-in-part of Ser. No. 696,952, Jan. 31, 1985, Pat. No. 4,653,585, Ser. No. 917,324, Oct. 9, 1986, and Ser. No. 922,916, Oct. 24, 1986, Pat. No. 4,716,966.

[51] Int. Cl.$^4$ ............................................. E21B 43/16
[52] U.S. Cl. ...................................... 166/274; 166/275; 166/292; 166/295; 252/8.554
[58] Field of Search ............................... 166/273–275, 166/294, 295, 292; 252/8.55 D

[56] References Cited

U.S. PATENT DOCUMENTS

| | | | |
|---|---|---|---|
| 3,984,333 | 10/1976 | van de Kraats et al. | 252/8.554 |
| 4,018,286 | 4/1977 | Gall et al. | 166/295 |
| 4,157,322 | 6/1979 | Colegrove | 260/15 |
| 4,210,206 | 7/1980 | Ely et al. | 166/294 |
| 4,498,540 | 2/1985 | Marrocco | 166/295 |
| 4,505,827 | 3/1985 | Rose et al. | 252/8.551 |
| 4,540,498 | 9/1985 | Wu et al. | 166/275 |
| 4,613,631 | 9/1986 | Espenscheid et al. | 523/130 |

*Primary Examiner*—Stephen J. Novosad
*Assistant Examiner*—Bruce M. Kisliuk
*Attorney, Agent, or Firm*—Alexander J. McKillop; Michael G. Gilman; Stanislaus Aksman

[57] ABSTRACT

The permeability of a subterranean oil-bearing formation is controlled by the injection of an aqueous solution of a cross-linked block copolymer containing polar and non-polar segments, with the polar segments generally making up at least 50 percent, usually 60 to 99 percent, of the copolymer. The polar segments are derived from an alkylene oxide and the non-polar segments from styrene or an alkyl styrene either by itself or with a diene. The copolymers are cross-linked with an amino resin or a combination of a phenolic and a water-dispersible aldehyde component. The resulting copolymer gels are stable at low pH conditions, such as those of $CO_2$ flood conditions.

32 Claims, No Drawings

1

OIL RESERVOIR PERMEABILITY CONTROL

CROSS-REFERENCE TO RELATED APPLICATIONS

This is a continuation-in-part of copending applications, Ser. No. 696,952, filed on Jan. 31, 1985, now U.S. Pat. No. 4,653,585, Ser. No. 917,324, filed on Oct. 9, 1986, and Ser. No. 922,916, filed on Oct. 24, 1986, now U.S. Pat. No. 4,716,966 the entire contents of all of which are incorporated herein by reference.

BACKGROUND OF THE INVENTION

1. Field of the Invention

This invention relates to the control of permeability in subterranean oil-bearing formations.

2. Discussion of Related Art

In the production of oil from subterranean oil reservoirs by various flooding techniques, especially waterflooding, it has become a common expedient to add various polymeric thickening agents to the water in order to decrease its mobility to a point where it approaches that of the crude oil which is to be displaced so as to improve the displacement of the oil from the reservoir. Use of polymers for this purpose is often stated to be for mobility control.

Another problem which arises in the various flooding processes is that different strata or zones in the reservoir often possess different permeabilities so that displacing fluids enter the high permeability or "thief" zones in preference to zones of lower permeability where significant quantities of oil may be left unless measures are taken to at least partially plug the high permeability zones to divert the displacing fluid into the low permeability zones. Mechanical isolation of the thief zones has been tried but vertical communication among reservoir strata often renders such measures ineffective. Physical plugging of the high permeability zones by cements and solid slurries has also been attempted with varying degrees of success but the most serious drawback of this approach is the possibility of permanently closing productive portions of the reservoir.

From these early experiences, the desirability of designing a viscous slug capable of sealing off the most permeable layers so that the floodwater or other driving fluid, such as gas or steam, would be diverted to the underswept, tighter regions of the reservoir, became evident. This led to the use of oil/water emulsions, gels and polymers for controlling the permeability of the formulations in a process frequently called "profile control" or "flood conformance", a reference to control of the vertical permeability profile of the reservoir. Profile control agents which have been proposed have included oil/water emulsions, gels, e.g., lignosulfonate gels and polymers, with polymers being the most extensively applied in recent years.

Among the polymers so far examined for improving flood conformance are polyacrylamides, polysaccarides, celluloses, furfural-alcohol and acrylic/epoxy resins, silicates and polyisocyanurates. A major part of this work has been conducted with the polyacrylamides, both in their normal, noncrosslinked form as well as in the form of metal complexes, as described, for example, in U.S. Pat. Nos. 4,009,755; 4,069,869 and 4,413,680. In either form, the beneficial effects derived from these polyacrylamides seem to dissipate rapidly due to shear degradation during injection and sensitivity to reservoir brines, low pH and high temperature. To overcome these problems and to achieve deeper penetration into the reservoir, dilute solutions of these polymers have sometimes been injected first and then complexed in situ.

Another group of polymeric thickeners which has received considerable attention for use in improving flooding are polysaccharides, particularly those produced by the action of bacteria of the genus Xanthomonas on carbohydrates. For example, U.S. Pat. Nos. 3,757,863 and 3,383,307 disclose a process for mobility control by the use of polysaccharides. U.S. Pat. Nos. 3,741,307; 4,009,755; 4,069,869 disclose the use of polysaccharides in the control of reservoir permeability. U.S. Pat. No. 4,413,680 describes the use of cross-linked polysaccharides for selective permeability control in oil reservoirs.

U.S. Pat. No. 3,908,760 describes a polymer waterflooding process in which a gelled, water-soluble Xanthomonas polysaccharide is injected into a stratified reservoir to form a slug, band or front of gel extending vertically across both high permeability and low permeability strata. This patent also suggests the use of complexed polysaccharides to block natural or man-made fractures in formations. The use of polyvalent metal ions for cross-linking polysaccharides is also disclosed in U.S. Pat. No. 3,810,882.

The use of various block copolymers for mobility control in waterflooding operations is described in U.S. Pat. Nos. 4,110,232, 4,120,801 and 4,222,881, but their use for permeability control has not been suggested.

Chung et al, in the aforementioned patent application Ser. No. 696,952 now U.S. Pat. No. 4,635,585, disclose the use of block copolymers, which may be cross-linked with polyvalent metal ions, as permeability control agents in enhanced oil recovery applications. However, polyvalent metal ions may not be effective cross-linking agents under all conditions encountered in the enhanced oil recovery applications, e.g., in acidic conditions, such as those encountered in carbon dioxide ($CO_2$) flooding operations.

There is therefore a continuing need for different types of polymer gels which are effective as permeability control agents in different types of reservoirs under diverse reservoir conditions, including acidic conditions.

SUMMARY OF THE INVENTION

According to the present invention, the permeability of the reservoir is controlled by the selective placement within the reservoir of an aqueous solution or dispersion of a cross-linked block copolymer of the AB or BAB type containing both polar and non-polar blocks. The copolymer is cross-linked either prior to the injection of the copolymer solution or dispersion, or in situ, by contacting the copolymer with at least one cross-linking agent which is an amino resin or a combination of a phenolic and a water-dispersible aldehyde component. The non-polar blocks of the polymer are derived from styrene or an alkylstyrene or hydrogenated diene-styrene units and the polar blocks are derived from an alkylene oxide. Generally, the polar blocks constitute at least about 50% by weight of the polymer but in certain cases as little as 30% by weight is sufficient to ensure that the block copolymer will be swollen by water to form an aqueous gel having the desired properties. Generally, the polar units constitute about 60 to about 99, preferably about 60 to about 80, weight percent of the polymer. The solubility of the polymer may be enhanced by the presence of solubilizing groups, such as sulfonate, in either the acid or salt form, i.e., as —$SO_3H$ or —$SO_3M$, where M is a metal, preferably an alkali metal, such as sodium, in which cases the proportion of the polar groups in the polymer may be lower than it would otherwise need to be.

DETAILED DESCRIPTION OF THE INVENTION

We found that the amino resins or phenolic/water-dispersible aldehyde components are very effective cross-linking agents for the block copolymers used herein. These cross-linking agents effectively form relatively stable gels even at pH conditions at which polyvalent metals may be ineffective as cross-linking agents or may form unstable gels. Thus, the cross-linking agents used herein form gels which are stable even at acidic formation conditions, e.g., at pH of about 5.5 or less, commonly encountered in $CO_2$ flooding operations.

Amino resins used as cross-linking agents are known in the art and are prepared by reacting formaldehyde with urea or melamine, as described, for example, in Kirk-Othmer ENCYCLOPEDIA OF CHEMICAL TECHNOLOGY, Third Edition, Volume 2, John Wiley and Sons (1978), pages 440–467, the entire contents of which are incorporated herein by reference. The resin must be soluble or dispersible in an aqueous medium. Non-limiting examples of resins which can be used are melamine formaldehyde, urea-formaldehyde, ethylene and propylene urea formaldehyde, triazone, uran, and glyoxal resins. The amount of an amino resin required for polymer cross-linking is about 0.1:1 to about 10:1 by weight of the polymer to the amino resin. The most preferred amino resin is melamine formaldehyde resin, derived from a reaction of melamine and formaldehyde, which has a molar ratio of melamine to formaldehyde of between about 1 to about 6. A ratio of between about 3 to about 6 is commonly used. Melamine formaldehyde resins are often fully or partially methylated to modify their reactivity and solubility. The melamine formaldehyde resin can be a commercial product. Included among these melamine-formaldehyde (melamine) resins are the partially methylated resins and the hexamethoxymethyl resins (e.g., American Cyanamid's Cymel TM 373, Cymel 370, Cymel 380 and Parez ® resins).

If the cross-linking agent is the combination of a phenolic and a water-dispersible aldehyde component, any suitable water-dispersible phenol or naphthol can be used as the phenolic component in the practice of the invention. Suitable phenols include monohydroxy and polyhydroxy naphthols. Phenolic compounds suitable for use in the present invention include phenol, catechol, resorcinol, phloroglucinol, pyrogallol, 4,4'-diphenol, and 1,3-dihydroxynaphthalene. Other phenolic components that can be used include at least one member of selected oxidized phenolic materials of natural or synthetic origin, such as 1,4-benzoquinone; hydroquinone or quinhydrone; as well as a natural or modified tannin, such as quebracho or sulfomethylated quebracho possessing a degree of sulfomethylation (DSM) up to about 50. (See U.S. Pat. No. 3,344,063, Col. 3, lines 15-32, which is incorporated herein by reference). The DSM of sulfomethylated quebracho (SMQ) is sometimes indicated by writing, for example, SMQ 50 for SMQ having a DSM of 50. Resorcinol and catechol are the preferred phenolic compounds for use in the present invention for most permeability control applications.

Any suitable water-dispersible aldehyde can be used in the practice of the invention. Thus, under proper conditions of use, both aliphatic and aromatic monoaldehydes, and also dialdehydes, can be used. The aliphatic monoaldehydes containing from one to about 10 carbon atoms per molecule are preferred. Representative examples of such aldehydes include formaldehyde, paraformaldehyde, acetaldehyde, propionaldehyde, butyraldehyde, isobutyraldehyde, valeraldehyde, heptaldehyde, decanal, and the like. Representative examples of dialdehydes include glyoxal, glutaraldehyde, terephthaldehyde, and the like. Various mixtures of said aldehydes can also be used in the practice of the invention. The term "water-dispersible" is employed generically herein to include both those aldehydes which are truly water-soluble and those aldehydes of limited water solubility but which are dispersible in water or other aqueous media to be effective gelling agents. Formaldehyde is the preferred aldehyde compound for use in the present invention.

Specific examples of suitable phenolic and water-dispersible aldehyde components are set forth in Swanson, U.S. Pat. No. 4,440,228, the entire contents of which are incorporated herein by reference. The preferred combinations of a phenolic and water-dispersible aldehyde components are phenol/formaldehyde and resorcinol/-formaldehyde.

Relative amounts of phenolic and aldehyde components are also set forth in Swanson. These amounts are small but effective to cause the gelation of an aqueous dispersion of the copolymer and the cross-linking agent. The effective amount of aldehyde is about 0.002 to about 2, preferably about 0.1 to about 0.8 weight percent, based on the total weight of the composition comprising the water, the polymer and the cross-linking agent.

Any suitable method can be employed for preparing the gelled compositions of the invention. Thus, any suitable mixing technique or order of addition of the components of said composition to each other can be employed which will provide a composition having sufficient stability to degeneration by the heat of the formation (in which composition is to be used) to permit good penetration of the composition into said formation. However, it is ordinarily preferred to first dissolve or disperse the polymer in water before contacting the polymer with the other components. The mixing order can vary with the type of polymer used. Some suitable mixing orders, with the components named in order to mixing, include: water-polymer-amino resin; amino resin-polymer-water; polymer-water-amino resin; water-polymer-phenolic compound-aldehyde; water-phenolic compound-polymer-aldehyde; phenolic compound-polymer-water aldehyde; and water-polymer-aldehyde-phenolic compound. It is within the scope of the invention to moisten or slurry the polymer with a small amount, e.g., about 1 to about 6 weight percent, based on the weight of the polymer, of a small amount of a low molecular weight alcohol, e.g., $C_1$ to $C_3$ alcohols, as a dispersion aid prior to dispersing the polymer in water.

The gelled compositions of the invention can be prepared on the surface in a suitable tank equipped with suitable mixing means, and then pumped down the well and into the formation employing conventional equipment for pumping gelled compositions. However, it is within the scope of the invention to prepare said compositions while they are being pumped down the well. For example, a solution of the polymer in water can be prepared in a tank adjacent the wellhead. Pumping of this solution through a conduit to the wellhead can then be started. Then, downstream from the tank, a suitable connection can be provided for introducing a crosslinking agent, e.g., an amino resin. As will be understood by those skilled in the art, the rate of introduction of said components into said conduit will depend upon the pumping rate of the polymer solution through said conduit. Any of the above-mentioned orders of addition can be employed in such an in situ technique. Mixing orifices can be provided in the conduit, if desired.

After the gelled composition is injected into the formation, the oil recovery process is conducted in the usual manner, i.e., a displacing fluid, which is miscible or immiscible with the oil, is injected into the formation. Suitable oil-miscible displacing fluids are carbon dioxide ($CO_2$), carbon monoxide (CO), methane, ethane, propane, butane, natural gas, liquid petroleum gas and mixtures thereof. $CO_2$ is the preferred oil-miscible displacing fluid. Suitable oil-immiscible displacing fluids are carbon dioxide, used under oil-immiscible conditions, water or an aqueous fluid, nitrogen, ambient air, steam, flue gas, and mixtures thereof.

The gelled composition of the invention may also be used in a so-called WAG (Water Alternating Gas) process, well known to those skilled in the art. In such a process, the injection of slugs of water is alternated with the injection of slugs of gas, such as $CO_2$. If a WAG process is used with the gelled compositions of the invention, the gelled composition or compositions are injected into the formation with one or more water slugs.

After the miscible transition zone is established between the formation oil and the displacing fluid, a driving fluid may be injected through the injection well to displace the oil, the transition zone and the displacing fluid through the formation towards the production well from which the oil is produced. The drive fluid is injected for a sufficient time to effect the displacement of the formation oil to the production well until either all of the oil has been displaced from the formation or until the economical limit of the ratio of the driving fluid to the formation oil has been reached.

The drive fluid or driving fluid used in the process of the invention may be any drive fluid known to those skilled in the art, but preferably it is a fluid selected from the group consisting of water, brine, methane, carbon dioxide, nitrogen, air, steam, separator gas, natural gas, flue gas and mixtures thereof. The driving fluid may contain additives, such as a surfactant, to maintain efficient displacement thereof.

It is within the scope of the invention to precede the injection of the gelled composition into the well and out into the formation with a preflush of a suitable cooling fluid, e.g., water. Such fluids serve to coll the well tubing and formation and extend the useful operating temperature range of said compositions. The volume of said cooling fluid so injected can be any suitable volume sufficient to significantly decrease the temperature of the formation being treated, and can vary depending upon the characteristics of the formation. For example, amounts up to 20,000 gallons or more can be used to obtain a temperature decrease on the order of 100° to 250° F.

The polymers which are used according to the present invention contain polar blocks and non-polar blocks and are of the AB or BAB type. Polymers of the BAB type include the following types:

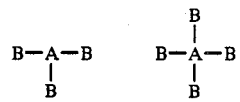

Block copolymers of this type in which the polar segments may be derived from alkylene oxides or sulfides are described in U.S. Pat. Nos. 3,954,915 and 3,867,295, the entire contents of which are incorporated herein by reference.

The block copolymers described in U.S. Pat. Nos. 3,954,915 and 3,867,295 are intended for use in fuels and lubricants, e.g., as detergents and dispersants. As such, they were required to be soluble or dispersible in hydrocarbon and non-hydrocarbon oils, fuels and lubricants. To ensure this, the amount of the polar block was kept below 50% of the weight of the polymer, preferably 5 to 25%. By contrast, the block copolymers used in the present invention are to be soluble in water, at least to an extent that they will be swollen by the water or form micelles that will thicken the water to the extent necessary for effective permeability control. Regardless of the actual solubility of the polymer in the water, polymers of this kind which are either soluble in water or which are swollen by water to form pumpable gels are referred to in this application as being soluble in water and their mixtures with water are referred to as being aqueous solutions even if the polymers form micellar dispersions rather than true solutions.

In order to confer the requisite water solubility, the amount of the polar units, which in the present case are derived from alkylene oxides, will generally be above 30% by weight of the polymer and more usually above about 50% by weight although, if solubility-enhancing groups, such as sulfonate, are present in the polymer, the proportion of polar units may be somewhat lower. Normally, however, the proportion of polar units will be about 60 to about 80% by weight of the polymer, although up to 99% by weight of these units may be present in the copolymer.

The materials used in the preparation of the polymers, e.g., alkyl styrene or mixtures of diene and styrene for the non-polar block, alkylene oxide for the polar block, solvents, anionic initiators, capping agents, etc. and the methods of preparation are those which are described in U.S. Pat. Nos. 3,954,915 and 3,867,295 to which reference is made for details of such materials and methods, except, as mentioned above, the proportion of the polar and non-polar blocks will be appropriately modified to confer the desired solubility properties. Further, because solubility in organic liquids is not desired, the non-polar blocks may be derived from styrene itself as well as alkylstyrenes and diene-styrene mixtures. In such cases, styrene will be used in the same way in the polymer preparation as the described alkylstyrenes, with appropriate adjustment in weight amounts for the lower molecular weight.

Thus, in summary, the non-polar block A will be formed by anionic polymerization of styrene or an alkylstyrene optionally with a diene. The diene-derived copolymers may be hydrogenated prior to the addition of the polar component of block B. The preferred polar components for block B are alkylene oxides, e.g. ethylene oxide. Termination and hydrogenation of the diene units may be carried out as described in U.S. Pat. Nos. 3,954,915 and 3,867,295.

The desired molecular weights in the blocks and the final copolymer will generally be as previously described, but the weight of the polar block will generally be greater in order to confer the desired solubility in water. Thus, the polar block will generally have at least 200 and preferably at least 1000 alkylene oxide units, with a molecular weight of at least 50,000, typically 50,000 to 300,000 for the entire polymer.

In order to improve the solubility of the polymer in water, solubility enhancing groups, such as sulfonate $-SO_3H$ or $-SO_3M$, may be added by treatment of the polymer with suitable reagents, e.g., by treating with sulfur trioxide the aromatic rings may be sulfonated and the acid sulfonic groups then neutralized with alkali, e.g., NaOH, KOH or $NH_4OH$. However, care should be taken not to use forcing conditions which would break up the polymer. The copolymers containing diene, e.g., butadiene segments in the non-polar block may be sulfonated on the diene units by the method described in U.S. Pat. No. 4,120,801 to which reference is made for a description of the method, which employs a liquid sulfur trioxide complex to sulfonate residual double bonds of the diene units. Alternatively, appropriately substituted styrenes or alkyl styrenes may be used as the monomers in the production of the original block copolymer.

If reactive groups, especially sulfonate, are present in the copolymer, they may be converted to other solubilizing groups by conventional chemical reactions. For example, sulfonate groups may be hydrolyzed to hydroxyl groups, as described in U.S. Pat. No. 4,120,801 or chloromethyl groups on the styrene unit may be quaternized by reaction with tertiary amines to form a quaternary nitrogen group. The reaction of copolymers with styrene units to form chloromethylated copolymers which are then quaternized by reaction with tertiary amines is described in U.S. Pat. No. 4,110,232, to which reference is made for details of these reactions.

The block copolymers are dissolved in water, at concentrations of about 1,000 to about 20,000 ppm, preferably about 2,000 to about 5,000 ppm, to provide the desired viscosity. The solution is then injected into the formation where it selectively blocks the more highly permeable regions, to control the subsequent flooding operation which may be carried out in a conventional manner. Injection of the solution into the formation may be carried out in a conventional manner using an injection well which extends from the surface of the earth into the formation, e.g. as described in U.S. Pat. Nos. 4,078,607, 3,305,016, 4,076,074, 4,009,755 and 4,069,869, to which reference is made for the descriptions of typical procedures which can be used herein. Briefly, the thickened aqueous liquid is injected into the formation through the injection well and in the formation it enters the more highly permeable stratum or strata in preference to the less permeable regions because of its viscosity. Once in place in the more highly permeable regions, the gel controls subsequent flooding operations by diverting the flood liquid, such as water or $CO_2$, to the less permeable or "tight" zones, increasing recovery from these zones. The amount of the viscous solution which is injected into the reservoir will generally be from 10% to 100% of the pore volume of the high permeability stratum or strata.

Because the compositions of the block copolymers may be readily varied, e.g., by changing the ratio of the polar to the non-polar blocks, the viscosifying effects of the polymers may also be varied. The block polymers therefore offer the possibility of formulating polymers according to specific reservoir conditions.

Because the alkylene oxide block copolymers possess a viscosifying effect in aqueous solutions, they may also be used for mobility control purposes in waterflooding operations. In carrying out waterflooding in this way, at least a portion of the water injected into the oil-bearing formation through the injection well contains the block copolymer in an amount which is sufficient to thicken the water and increase its viscosity to a point where it is closer to that of the oil, so as to increase the efficiency of the displacement of the oil from the formation. Normally, the amount off the copolymer should be sufficient to achieve a mobility ratio equal to or less than 1 for the reservoir oil to the injected water, as described in U.S. Pat. No. 3,025,237, to which reference is made. In many cases, the relative permeabilities of the reservoir to oil and water are discounted in arriving at the mobility ratio so that the desired viscosity of the thickened water will be at least that of the reservoir oil, typically in the range of 1 to 4 times that of the reservoir oil. Continued injection of the water drives the displaced oil through the formation to the production well from which it is recovered. In order to reduce the cost of the flood, it may be preferable to include the copolymer in only the initial portion of the flooding water; the concentration of the polymer may be decreased gradually or stepwise after the initial portion and the portion which is injected last may be free of the copolymer entirely. In this manner, a progressive decrease in the viscosity of the flood water is achieved.

It will be apparent to those skilled in the art that the specific embodiments discussed above can be successfully repeated with ingredients equivalent to those generically or specifically set forth above and under variable process conditions.

From the foregoing specification, one skilled in the art can readily ascertain the essential features of this invention and without departing from the spirit and scope thereof can adapt it to various diverse applications.

We claim:

1. A method for controlling the permeability of a subterranean formation, which comprises injecting into the formation an aqueous solution of a cross-linked block copolymer having at least one polar and at least one non-polar segment, the polar segment being derived from a polymerized alkylene oxide and the non-polar segment from styrene or an alkylstyrene, the polar segments constituting at least 30 weight percent of the copolymer, the block copolymer being cross-linked with a cross-linking agent which is an amino resin or a combination of a phenolic component and a water-dispersible aldehyde component to selectively block the high permeability regions of the formation.

2. A method according to claim 1 in which the polar segment constitutes at least about 50 weight percent of the copolymer.

3. A method according to claim 2 in which the polar segment constitutes from about 60 to about 99 weight percent of the copolymer.

4. A method according to claim 3 in which the polar segment constitutes from about 60 to about 80 weight percent of the copolymer.

5. A method according to claim 4 in which the non-polar segment comprises copolymerized styrene and diene units.

6. A method according to claim 5 in which the non-polar segment comprises polymerized alkylstyrene units.

7. A method according to claim 5 in which the non-polar segment comprises polymerized styrene units.

8. A method according to claim 7 in which the copolymer has solubilizing functional groups on the non-polar segment.

9. A method according to claim 6 in which the copolymer has solubilizing functional groups on the non-polar segment.

10. A method according to claim 8 in which the solubilizing functional groups are sulfonate groups.

11. A method according to claim 9 in which the solubilizing functional groups are sulfonate groups.

12. A method according to claim 11 in which the copolymer comprises at least 1000 alkylene oxide units in the polar block.

13. A method according to claim 10 in which the copolymer comprises at least 1000 alkylene oxide units in the polar block.

14. A method according to claim 13 in which the copolymer has a molecular weight of from 50,000 to 300,000.

15. A method according to claim 12 in which the copolymer has a molecular weight of from 50,000 to 300,000.

16. A method according to claim 15 in which the solution contains about 1,000 to about 20,000 ppm of the copolymer.

17. A method according to claim 14 in which the solution contains about 1,000 to about 20,000 ppm of the copolymer.

18. A method according to claim 17 in which the solution contains about 2,000 to about 5,000 ppm of the copolymer.

19. A method according to claim 16 in which the solution contains about 2,000 to about 5,000 ppm of the copolymer.

20. A method according to claim 19 in which the amino resin is produced by reacting formaldehyde with urea or melamine.

21. A method according to claim 18 in which the amino resin is produced by reacting formaldehyde with urea or melamine.

22. A method according to claim 19 wherein the cross-linking agent is phenol/formaldehyde or resorcinol/formaldehyde.

23. In a method of recovering oil from an oil-bearing subterranean formation penetrated by an injection well and a production well, in which an aqueous fluid is injected into the formation through the injection well to displace oil to the production well, the improvement comprising employing, in at least the initial portion of the aqueous fluid injected into the formation, a water soluble block copolymer having at least one polar and at least one non-polar segment, the polar segment being derived from a polymerized alkylene oxide, and the non-polar segment from styrene or an alkyl styrene, the polar segments constituting at least 30 weight percent of the copolymer, the copolymer being cross-linked with a cross-linking agent which is an amino resin or a combination of a phenolic component and a water-dispersible aldehyde component, the copolymer being present in the fluid in an amount sufficient to provide improved efficiency in displacing the oil to the production well.

24. A method according to claim 23 in which the amount of the copolymer is sufficient to provide a mobility ratio of at least 1 for the reservoir oil to the aqueous fluid.

25. A method according to claim 24 in which the copolymer has a molecular weight of 50,000 to 300,000.

26. A method according to claim 25 in which the copolymer comprises 60 to 99 weight percent of the polar segment.

27. A method according to claim 26 in which the copolymer comprises 60 to 80 weight percent of the polar segment.

28. A method according to claim 27 wherein the amino resin is produced by reacting formaldehyde with urea or melamine.

29. A method according to claim 27 wherein the cross-linking agent is phenol/formaldehyde or resorcinol/formaldehyde.

30. In a method of recovering oil from an oil-bearing subterranean formation penetrated by an injection well and a production well, in which an oil-miscible or oil-immiscible displacing fluid is injected into the formation through the injection well to displace oil to the production well, the improvement comprising injecting into the formation, prior to the injection of the displacing fluid, an aqueous fluid containing a water soluble block copolymer having at least one polar and at least one non-polar segment, the polar segment being derived from a polymerized alkylene oxide, and the non-polar segment from styrene or an alkyl styrene, the polar segments constituting at least 30 weight percent of the copolymer, the copolymer being cross-linked with a cross-linking agent which is an amino resin or a combination of a phenolic component and a water-dispersible aldehyde component, the copolymer being present in the aqueous fluid in an amount sufficient to provide improved efficiency in displacing the oil to the production well.

31. A method of claim 30 wherein the fluid is an oil-immiscible fluid.

32. A method of claim 31 wherein the fluid is carbon dioxide.

* * * * *